United States Patent
Harita et al.

(10) Patent No.: US 7,615,955 B2
(45) Date of Patent: Nov. 10, 2009

(54) WASHER CONTROLLER AND WASHER SYSTEM FOR VEHICLE

(75) Inventors: Yasuhiro Harita, Kosai (JP); Yoshito Hirota, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 263 days.

(21) Appl. No.: 11/498,898

(22) Filed: Aug. 4, 2006

(65) Prior Publication Data

US 2007/0029961 A1 Feb. 8, 2007

(30) Foreign Application Priority Data

Aug. 5, 2005 (JP) ............................. 2005-228702

(51) Int. Cl.
*B60S 1/48* (2006.01)
*B60S 1/46* (2006.01)

(52) U.S. Cl. ................ 318/483; 318/445; 318/DIG. 2; 15/250.02; 239/284.1

(58) Field of Classification Search ......... 318/443–445, 318/483, 484, DIG. 2; 15/250.02, 250.04; 239/284.1
See application file for complete search history.

(56) References Cited

U.S. PATENT DOCUMENTS

| | | | | |
|---|---|---|---|---|
| 4,275,477 A | * | 6/1981 | Kato | ........................... 318/443 |
| 4,393,341 A | * | 7/1983 | Byrne | ......................... 318/443 |
| 4,851,745 A | * | 7/1989 | Ponziani | ...................... 318/443 |
| 5,105,134 A | * | 4/1992 | Shimizu et al. | ............. 318/445 |
| 5,245,259 A | * | 9/1993 | Nakamura et al. | .......... 318/443 |
| 5,789,886 A | * | 8/1998 | Ivice | ........................... 318/444 |
| 5,944,910 A | * | 8/1999 | Fujii | ........................ 15/250.04 |
| 6,236,180 B1 | * | 5/2001 | Contos et al. | ................ 318/444 |
| 6,582,526 B2 | | 6/2003 | Lersch et al. | |
| 7,345,444 B2 | * | 3/2008 | Turner et al. | .................. 318/443 |
| 2005/0076462 A1 | * | 4/2005 | Turner et al. | .............. 15/250.02 |

FOREIGN PATENT DOCUMENTS

| | | | | |
|---|---|---|---|---|
| JP | 57051544 A | * | 3/1982 | |
| JP | A-5-185908 | | 7/1993 | |
| JP | 2008006971 A | * | 1/2008 | |

* cited by examiner

*Primary Examiner*—Walter Benson
*Assistant Examiner*—Eduardo Colon-Santana
(74) *Attorney, Agent, or Firm*—Posz Law Group, PLC

(57) ABSTRACT

A washer controller controls a washer motor in accordance with a manipulation of a washer switch. A washer switch detector determines whether a manipulation of the washer switch is performed within a predetermined time period of a last manipulation of the washer switch. A spray time controller sets a spray time to a first set time when the manipulation of the washer switch is performed within the predetermined time period of the last manipulation, and to a second set time when the manipulation of the washer switch is performed after the predetermined time period, the second set time being greater than the first set time. A washer motor controller operates the washer motor for a time period corresponding to the spray time set by the spray time controller.

12 Claims, 5 Drawing Sheets

WASHER CONTROLLER AND WASHER SYSTEM FOR VEHICLE

CROSS REFERENCE TO RELATED APPLICATION

This application is based upon and claims the benefit of priority of Japanese Patent Application No. 2005-228702 filed on Aug. 5, 2005, the content of which is incorporated herein by reference.

FIELD OF THE INVENTION

The present invention relates to a washer controller and a washer system for a vehicle, especially the washer controller and the washer system that sprays cleaning liquid in accordance with a manipulation of a washer switch.

BACKGROUND OF THE INVENTION

JP-H05-185908-A, for example, discloses a washer system for a vehicle, which is configured so as to spray the cleaning liquid and operate the wiper to be interlocked with each other, corresponding to a manipulation of a washer switch, and performs at least one wiping operation of the wiper after the system stops spraying the cleaning liquid.

Further, the washer system according to JP-H05-185908-A is configured so as to operate the wiper again when a predetermined interval time is elapsed since the operation of the wiper stops. Thus, the washer system can securely wipe the cleaning liquid running downward on the vehicular window glass.

However, an excessive cleaning liquid supply is also a reason why the cleaning liquid runs downward on the vehicular window glass even when at least one wiping operation of the wiper is performed after the system stops spraying the cleaning liquid by the washer system according to JP-H05-185908-A.

The excessive cleaning liquid supply is a wastage that can cause the above-mentioned adverse effect to run the cleaning liquid downward on the window glass, to increase a consumption quantity of the cleaning liquid stored in a washer tank, and to increase a specified capacity of the washer tank.

SUMMARY OF THE INVENTION

The present invention is achieved in view of the above-described issues, and has an object to provide a washer controller and a washer system for a vehicle that can avoid an excessive cleaning liquid supply by spraying cleaning liquid by quantities appropriate to respective conditions of a washing surface.

A washer controller for a vehicle controls a washer motor in accordance with a manipulation of a washer switch so as to spray a cleaning liquid onto a window glass of the vehicle. The washer controller includes a washer switch detector, a spray time controller and a washer motor controller.

The washer switch detector determines whether the manipulation of the washer switch is performed within a predetermined time period of a last manipulation of the washer switch or after the predetermined time period.

The spray time controller sets a spray time to spray the cleaning liquid to a first set time when the washer switch detector determines that the manipulation of the washer switch is performed within the predetermined time period of the last manipulation, and to a second set time when the washer switch detector determines that the manipulation of the washer switch is performed after the predetermined time period, the second set time being greater than the first set time.

The washer motor controller operates the washer motor for a time period corresponding to the spray time set by the spray time controller.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Figure 1:
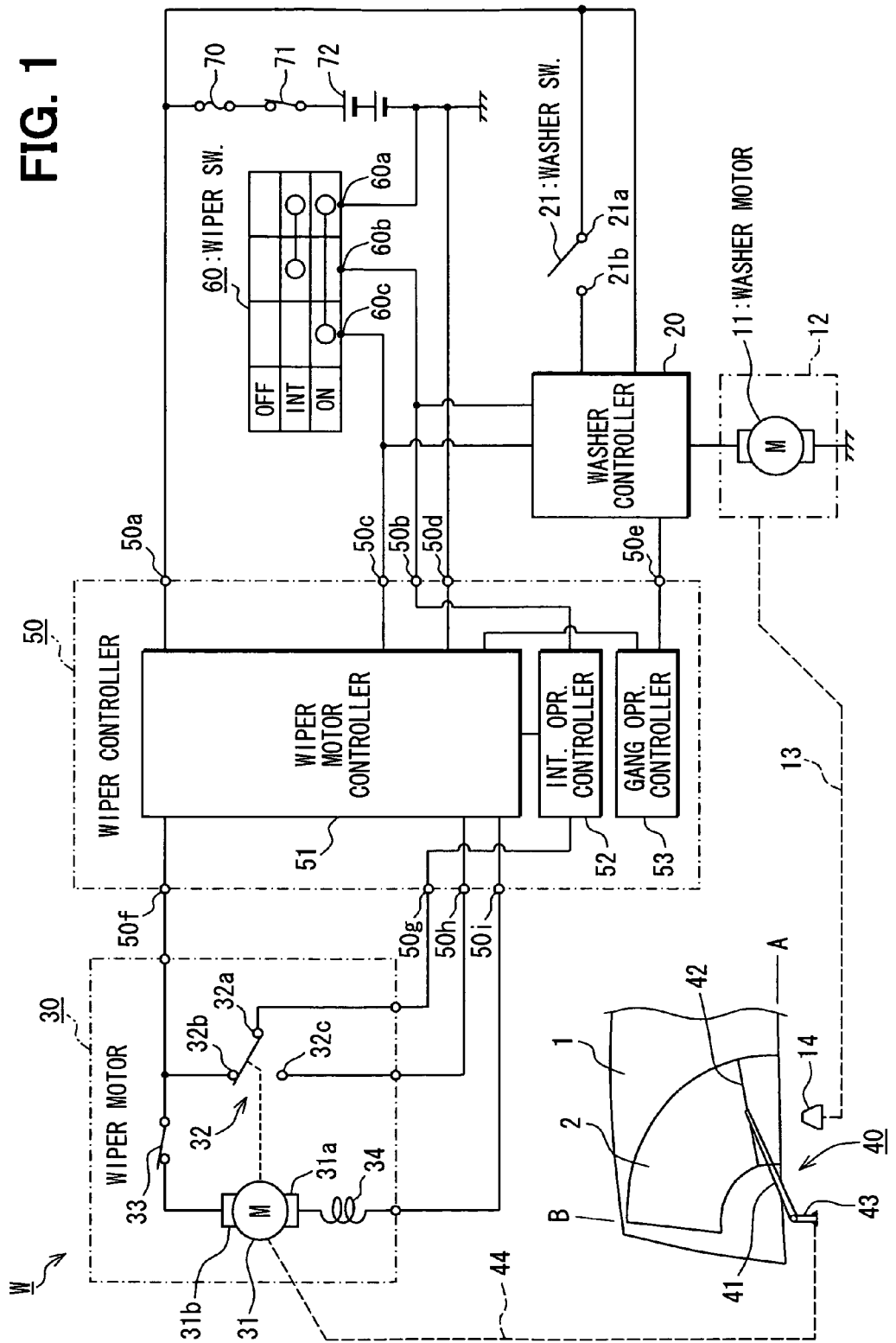
FIG. 1 is a block diagram showing a construction of a washer system according to an embodiment of the present invention.

In the following is described a washer controller and a washer system for a vehicle according to an embodiment of the present invention, referring to the drawings.

FIG. 1 schematically depicts an entire construction of a vehicular windshield washer system W (hereinafter referred to just as washer system W) according to the present embodiment of the present invention. The washer system W according to the present embodiment washes a surface of a windshield glass 1 by spraying cleaning liquid onto the windshield glass 1 and wiping the windshield glass 1 with a wiper blade 42 to be interlocked with spraying operations of the cleaning liquid.

The washer system W according to the present embodiment includes: a washer motor 11 that is installed in a washer tank 12; a washer controller 20 that controls an operation of the washer motor 11; a wiper motor 30; a wiper 40 that wipes the windshield glass 1 in accordance with an operation of the wiper motor 30; and a wiper controller 50 that controls an operation of the wiper motor 30.

The washer controller 20 in the present embodiment operates the washer motor 11 in accordance with a manipulation of the washer switch 21. The washer controller 20 is configured to inject a varied quantity of the cleaning liquid onto the surface of the windshield glass 1 by changing a spray time in accordance with specified conditions.

The washer switch 21 in the present embodiment is a momentary switch that bridges the contacts 21a, 21b during it is operated. One contact 21a of the washer switch 21 is connected via the fuse 70 and the ignition switch 71 to a positive pole terminal of the in-vehicle battery 72. The other contact 21b of the contact 21b is connected to the washer controller 20. A negative pole terminal of the in-vehicle battery 72 is grounded to a vehicle body. Thus, when the washer switch 21 is turned on, an ON signal is inputted into the washer controller 20.

The positive pole terminal of the in-vehicle battery 72 is separately connected to the washer controller 20, so that the washer controller 20 is supplied with electric power from the in-vehicle battery 72.

The washer motor 11 is integrally installed in the washer tank 12 that stores the cleaning liquid. The washer motor 11 and the washer tank 12 are located in an engine room of the vehicle. One end of a hose 13 is connected to the washer motor 11. The other end of the hose 13 is connected to a washer nozzle 14 that is located on a vehicular panel or in the wiper 40 (specifically in a wiper arm 41 or in the wiper blade 42).

When the washer motor 11 operates, the cleaning liquid in the washer tank 12 is pressure-supplied through the hose 13 to the washer nozzle 14. Thus, the cleaning liquid is injected out of the washer nozzle 14 onto the windshield glass 1 in a specific spray pattern.

The wiper controller 50 in the present embodiment is configured to operate the wiper motor 30 in accordance with a switching operation of a wiper switch 60. The wiper controller 50 is configured to operate the wiper 40 to be interlocked with the operation of the washer motor 11, which is in accordance with a switching operation of the washer switch 21.

As in the washer controller 20, the washer controller the terminal 50a of the wiper controller 50 is connected via the fuse 70 and the ignition switch 71 to the positive pole terminal of the in-vehicle battery 72. Thus, while the ignition switch 71 is turned on, the wiper controller 50 is supplied with electric power.

The wiper controller 50 includes a wiper motor controller 51, an intermittent operation controller 52 and a gang operation controller 53.

The wiper motor controller 51 connects and disconnects a terminal 50a, which is an electric power input terminal for inputting a power supply voltage, to a terminal 50i, which is an electric power output terminal, in accordance with a switched position of the wiper switch 60, so as to start and stop the operation of the wiper motor 30.

The intermittent operation controller 52 connects the terminal 50a to the terminal 50i for predetermined operation time periods at predetermined time intervals so that the wiper blade 42 wipes the windshield glass 1 to-and-fro at the predetermined time intervals.

The gang operation controller 53 receives a washer operation signal, which indicates that the washer motor 11 is in operation, from the washer controller 20, so as to operate the wiper motor 30 to be interlocked with the operation of the washer motor 11.

The wiper switch 60 in the present embodiment can be switched between an OFF (stop) position, an INT (intermittent) position and an ON (wipe) position. The wiper switch 60 has contacts 60a, 60b, 60c. When the wiper switch 60 is in the OFF position, the contacts 60a, 60b, 60c are not electrically connected one another. When the wiper switch 60 is switched in the ON position, the contact 60a and the contact 60c are connected to each other. When the wiper switch 60 is switched in the INT position, the contact 60a and the contact 60b are connected to each other.

The contact 60a is grounded to the vehicle body. The contacts 60b, 60c are connected to respective terminals 50b, 50c of the wiper controller 50. A terminal 50d of the wiper controller 50 is grounded to the vehicle body.

The contact 60b, 60c of the wiper switch 60 is respectively connected to the washer controller 20. Thus, as described below, the washer controller 20 can determine whether the wiper switch 60 is switched in operational positions (the ON position and the INT position) or not, that is, whether the wiper switch 60 is switched out of the OFF position. That is, when the wiper switch 60 is switched in the ON position or in the INT position, the contact 60b or the contact 60c is grounded, so that the washer controller 20 determines that the wiper switch 60 is switched in the operational positions by using a decrease of an electric potential.

The wiper motor 30 generally comprises a wiper motor body 31 and a wiper return switch 32.

The wiper motor body 31 in the present embodiment is provided with: a brush motor that revolves only in one rotational direction by being energized; and a speed reduction mechanism that reduces a rotational output of the brush motor. An output shaft of the wiper motor body 31 is coupled to a link mechanism 44. One brush 31a of the wiper motor body 31 is connected via a noise-preventing choke coil 34 to the terminal 50i, which is the electric power output terminal of the wiper controller 50. The other brush 31b of the wiper motor body 31 is connected via an overheat protection device 33 to a terminal 50f, which is a grounding terminal of the wiper controller 50.

The terminal 50i of the wiper controller 50 is connected to the terminal 50a so as to impress a positive voltage of the in-vehicle battery 72 to the terminal 50i during an operation of the wiper motor body 31. The terminal 50f is grounded to the vehicle body at all times. Thus, the brush 31a acts as a positive pole and the brush 31b acts as a negative pole during the operation of the wiper motor body 31.

The overheat protection device 33 interrupts a power supply to protect the motor body 31 from being burnt voltage when the wiper motor body 31 is in a overheat state to equal or exceed a predetermined temperature, and/or in an overcurrent state to equal or exceed a predetermined current value. The overheat protection device 33 is in a closed state (connection state) in normal times.

The wiper motor body 31 in the present embodiment is configured to transmit a driving force via the link mechanism 44 to a pivot shaft 43. The link mechanism 44 converts a rotational movement of the wiper motor body 31 to a reciprocated sway movement. The pivot shaft 43 is rotatably installed on the vehicular panel so as to protrude its leading end out of the vehicular panel. A base end portion of the wiper 40 is fixed to the leading end of the pivot shaft 43. The wiper 40 includes: a wiper arm 41 that is connected to a leading end of the pivot shaft 43; and a wiper blade 42 that is fixed to the leading end side portion of the wiper arm 41.

When the wiper motor body 31 rotates, the link mechanism 44 converts the rotational movement of the output shaft to the reciprocated sway movement, so that the pivot shaft 43 rotates to-and-fro. Then, the wiper 40 wipes the windshield glass 1 to-and-fro in accordance with the reciprocated rotational movement of the pivot shaft 43. Thus, the wiper blade 42 swings to-and-fro between a first position (stop position) A and a second position B so as to wipe a sector-like shaped wiping area 2.

In the wiper stop switch 32, a moving contact revolves to be interlocked with the output shaft of the wiper motor body 31. The wiper stop switch 32 is in an OFF state to bridge a contact 32a and a contact 32b when the wiper blade 42 is in the stop position A. The wiper stop switch 32 is in an ON state to bridge the contact 32a and the contact 32c when the wiper blade 42 is in positions other than the stop position A.

The contact 32c is connected to the terminal 50h of the wiper controller 50. The terminal 50h is connected via the wiper motor controller 51 to the terminal 50*a*. The terminal 50*h* is supplied with the positive pole voltage of the in-vehicle battery 72 at all times.

The contact 32*a* is connected to the terminal 50*g* of the wiper controller 50. The terminal 50*g* is connected to the intermittent operation controller 52, and configured to be connected via the wiper motor controller 51 to the terminal 50*i* at least when the wiper switch 60 is in the OFF position.

The contact 32*b* is grounded to the terminal 50*f* of the wiper controller 50, so as to be grounded to the vehicle body at all times.

The wiper return switch 32 remains in the ON state to bridge the contact 32*a* and the contact 32*c* until the wiper blade 42 reaches the stop position A. When the wiper return switch 32 is in the ON state, the wiper motor body 31 is supplied with electric power even if the wiper switch 60 is switched in the OFF position. That is, when the wiper switch 60 is in the OFF position, the power supply voltage is impressed via the terminal 50*a*, the terminal 50*h*, the contact 32*c*, the contact 32*a*, the terminal 50*g* and the terminal 50*i* to the brush 31*a* of the wiper motor body 31, so as to move the wiper blade 42 to the stop position A. When the wiper blade 42 reaches the stop position A, the wiper return switch 32 is switched in the OFF state to bridge the contact 32*a* and the contact 32*b*.

On a condition that the wiper switch 60 is in the OFF position, the power supply voltage to the terminal 50*i* stops so as to interrupt the electric power supply to the wiper motor body 31 when the wiper return switch 32 is switched in the OFF state. Thus, the wiper blade 42 keeps stopping in the stop position after reaching the stop position A.

When the wiper switch 60 is switched in the ON position, the terminal 50*c* is grounded, so that the wiper motor controller 51 operates in a normal operational mode. That is, the wiper motor controller 51 connects the terminal 50*a* to the terminal 50*i*, and keeps the terminal 50*f* to be grounded via the terminal 50*d*, so as to operate the wiper motor body 31 continuously.

When the washer motor 11 is operated, the gang operation controller 53 outputs an ON signal to the wiper motor controller 51. Thus, as the wiper switch 60 is switched in the ON position, the wiper motor body 31 continuously operates. When the ON signal is stopped, the wiper motor controller 51 keeps connecting the terminal 50*a* to the terminal 50*i* for a specified time to perform at least one wiping operation of the wiper blade 42, and then disconnects the terminal 50*a* from the terminal 50*i*.

When the wiper switch 60 is switched in the INT position, the terminal 50*b* is grounded, so that the intermittent operation controller 52 intermittently operates the wiper motor controller 51. That is, the intermittent operation controller 52 controls the wiper motor controller 51 to connect the terminal 50*a* to the terminal 50*i* for the predetermined operation time periods at the predetermined time intervals.

When the terminal 50*a* is connected to the terminal 50*i*, and the wiper blade 42 is moved out of the stop position A by the wiper motor body 31, the wiper return switch 32 is switched in the ON state. In this time, the power supply voltage is supplied via the terminal 50*g* to the intermittent operation controller 52. Then, the wiper return switch 32 is switched in the OFF state again when the wiper blade 42 returns to the stop position A, so that the power supply voltage is not supplied via the terminal 50*g* to the intermittent operation controller 52. In this time, the intermittent operation controller 52 has already disconnected the terminal 50*a* from the terminal 50*i*. Thus, the wiper motor body 31 stops, so as to keep stopping the wiper blade 42 in the stop position A.

After the predetermined time interval is elapsed since the power supply voltage via the terminal 50*g* to the intermittent operation controller 52 is stopped, the intermittent operation controller 52 connects the terminal 50*a* to the terminal 50*i* again for the predetermined operation time period. In this manner, when the wiper switch 60 is switched in the INT position, the wiper blade 42 wipes the windshield glass 1 to-and-fro at the predetermined time intervals.

Figure 2:
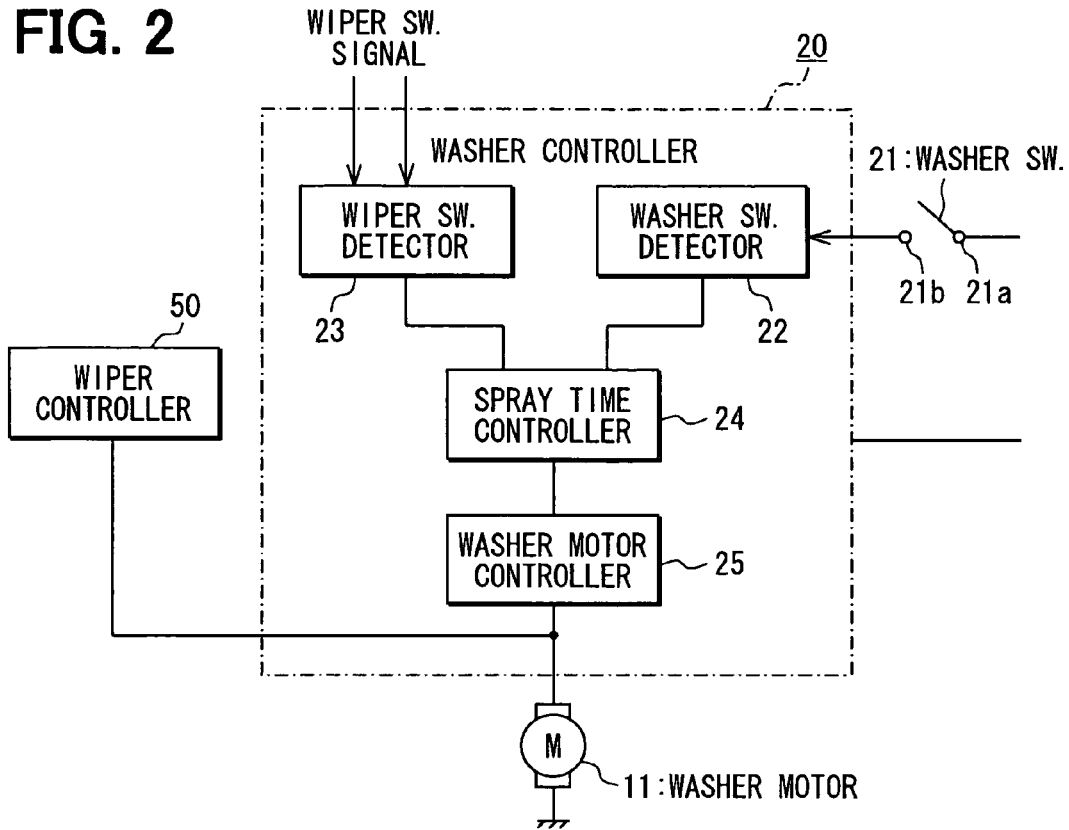
FIG. 2 is a block diagram showing a construction of a washer controller according to the embodiment.

In the following is described the washer controller 20 in the present embodiment, referring to FIG. 2. The washer controller 20 has a washer switch detector 22, a wiper switch detector 23, a spray time controller 24, and a washer motor controller 25 as main elements thereof.

The washer switch detector 22 in the present embodiment detects the manipulation of the washer switch 21 and determines whether a set time Ts is elapsed or not since the last manipulation of the washer switch 21 at the time. The washer switch detector 22 outputs a washer switch ON signal to the spray time controller 24 so as to indicate the manipulation of the washer switch 21. If the washer detector determines that the set time Ts is not elapsed, the washer switch detector 22 further outputs a below-set time signal to the spray time controller 24 during the manipulation of the washer switch 21.

The washer switch detector 22 is connected to the contact 21*b* of the washer switch 21. Thus, a low level signal is inputted to the washer switch detector 22 while the washer switch 21 is switched in an OFF state, and a high level signal is inputted to the washer switch detector 22 due to an application of the power supply voltage while the washer switch is switched in an ON state by the manipulation of the washer switch 21. The washer switch detector 22 detects the manipulation of the washer switch 21 in this manner.

The washer switch detector 22 starts an internal timer when the washer switch detector 22 detects the washer switch 21 is switched off by a manipulation release of the washer switch 21. Then, the washer switch detector 22 stops the internal timer when the washer switch detector 22 detects the next manipulation of the washer switch 21, and calculates an interval time Tint since the last manipulation release of the washer switch 21. The washer switch detector 22 outputs the below-set time signal when the interval time Tint is within the set time Ts.

The wiper switch detector 23 in the present embodiment determines whether the wiper switch 60 is switched in the operational positions or not. The wiper switch detector 23 outputs a wiper operation signal to the spray time controller 24 while the wiper switch detector 23 is detecting that the wiper switch 60 is switched in the operational positions.

The wiper switch detector 23 is connected to the contacts 60*b*, 60*c* of the wiper switch 60. The contacts 60*b*, 60*c* are grounded when the wiper switch 60 is switched in the INT position or in the ON position. Thus, when the contacts 60*b* or 60*c* is grounded, the wiper switch detector 23 receives the low-level signal from the contact 60*b* or from the contact 60*c* as the wiper switch signal, so as to determine that the wiper switch 60 is switched in the INT position or in the ON position.

The spray time controller 24 in the present embodiment sets a spray time Tsp of the cleaning liquid, and outputs the washer operation signal to the washer motor controller 25 continuously for a period of the spray time Tsp.

The spray time controller 24 receives the washer switch ON signal and the below-set time signal, which indicates that the washer switch is 21 is manipulated or not, from the washer switch detector 22. The spray time controller 24 further receives the wiper operation signal, which indicates that the wiper switch 60 is switched in the operational positions, from the wiper switch detector 23.

The spray time controller 24 determines whether a manipulation duration of the washer switch 21 is greater than a set time T0 (first predetermined time T01, second predetermined time T02), or within the set time T0, by using the washer switch ON signal. Further, the spray time controller 24 monitors whether the wiper motor 30 is in operation or not, by using the wiper operation signal.

When the manipulation of the washer switch 21 is performed for a period within the set time T0 while the wiper motor 30 is not in operation, and the spray time controller 24 is receiving the below-set time signal, the spray time controller 24 sets the spray time Tsp to a first set time t1 (0.2 second in the present embodiment). When the manipulation of the washer switch 21 is performed for a period within the set time T0 while the wiper motor 30 is not in operation, and the spray time controller 24 is not receiving the below-set time signal, the spray time controller 24 sets the spray time Tsp to a second set time t2 (0.5 second in the present embodiment). The second set time t2 is set greater than the first set time t1.

When the manipulation of the washer switch 21 is performed for a period within the set time T0 while wiper motor 30 is not in operation, and the set time Ts has elapsed since the last cleaning liquid supply, the spray time controller 24 sets the spray time Tsp of the cleaning liquid to a relatively long second set time t2. In this case, a long time has elapsed since the last the cleaning liquid supply, so that it is assumed that the surface of the windshield glass 1 is dry or almost dry. Accordingly, in the present embodiment, the spray time Tsp is set to the second set time t2, so as to supply the cleaning liquid sufficiently but not excessively.

When the manipulation of the washer switch 21 is performed for the period within the set time T0 while the wiper motor 30 is not in operation, and the set time Ts has not elapsed since the last cleaning liquid supply, the spray time controller 24 sets the spray time Tsp of the cleaning liquid to a first set time t1 that is smaller than the second set time t2. In this case, only a short time has elapsed since the last cleaning liquid supply, so that it is assumed that the surface of the windshield glass 1 is wet or half-wet.

Accordingly, only a small spray quantity of the cleaning liquid is enough for the wet or half-wet surface of the windshield glass 1. Thus, the spray time Tsp is set to the first set time t1 so as to inject only a small quantity of the cleaning liquid. Thus, it is possible to avoid an excessive cleaning liquid supply, so that the cleaning liquid does not run downward after the wiper blade 42 has wiped the wiping area 2 on the windshield glass 1 to-and-fro by several times, for example. Further, by avoiding the excessive cleaning liquid supply, it becomes possible reduce a frequency to refill the cleaning liquid in the washer tank 12.

When the manipulation of the washer switch 21 is performed for the period within the set time T0 while the wiper motor 30 is in operation, the spray time controller 24 sets the spray time Tsp to a third set time t3 (0.2 second in the present embodiment) that is smaller than the second set time t2. In this case, the wiper motor 30 is moving, so that it is assumed that the surface of the windshield glass 1 is considerably wet due to a rainfall, for example. Accordingly, even the spray time Tsp, which is set to the third set time t3 smaller than the second set time t2 for injecting only a small quantity of the cleaning liquid, is enough to supply a required quantity of the cleaning liquid for the considerably wet surface of the windshield glass 1. Thus, it is possible to avoid an excessive cleaning liquid supply.

When the manipulation of the washer switch 21 is performed for a period greater than the set time T0, the spray time controller 24 sets the spray time Tsp of the cleaning liquid in accordance with the manipulation duration of the washer switch 21. That is, the spray time controller 24 keeps outputting the operation signal to the washer motor controller 25 so as to spray the cleaning liquid onto the windshield glass 1 during the manipulation of the washer switch 21.

The condition that a manipulator (driver) keeps manipulating the washer switch 21 for a relatively long period greater than the set time T0 indicates that the windshield glass 1 is severely soiled so as to require a relatively large quantity of the cleaning liquid. Thus, in this condition, the washer controller 20 controls the washer motor 11 so as to keep spraying the cleaning liquid for the throughout manipulation of the washer switch 21.

The washer motor controller 25 in the present embodiment supplies a driving voltage to the washer motor 11 to operate the washer motor 11 in accordance with the washer operation signal, which is outputted from the spray time controller 24 so as to correspond to the set spray time Tsp. When the spray time Tsp is set to the first set time t1 (0.2 second in the present embodiment), for example, the washer motor 11 is supplied with the driving voltage for the throughout period of the first set time t1. When the manipulator keeps the washer switch 21 in the ON state, the washer motor 11 is supplied with the driving voltage for a throughout duration of the ON state of the washer switch 21.

The driving voltage, which is supplied from the washer motor controller 25 to the washer motor 11, is impressed as the washer operation signal, via the terminal 50e to the gang operation controller 53 of the wiper controller 50. The gang operation controller 53 monitors the operation of the washer motor 11 by using an increase of an electric potential at the terminal 50e.

Thus, the gang operation controller 53 starts outputting the ON signal to the wiper motor controller 51 slightly after the driving voltage starts being supplied from the washer motor controller 25 to the washer motor 11. Accordingly, the wiper motor controller 51 connects the terminal 50a to the terminal 50i so as to start operating the wiper motor body 31 just after a predetermined delay time.

After the driving voltage stops being supplied from the washer motor controller 25 to the washer motor 11, the gang operation controller 53 outputs the ON signal continuously so as to perform at least one to-and-fro wiping operation of the wiper blade 42, and then stops outputting the ON signal. Thus, the wiper motor controller 51 keeps connecting the terminal 50a to the terminal 50i while the wiper motor controller 51 receives the ON signal, and disconnects the terminal 50a from the terminal 50i when the wiper motor controller 51 stops receiving the ON signal so as to stop the operation of the wiper motor body 31.

Figure 3:
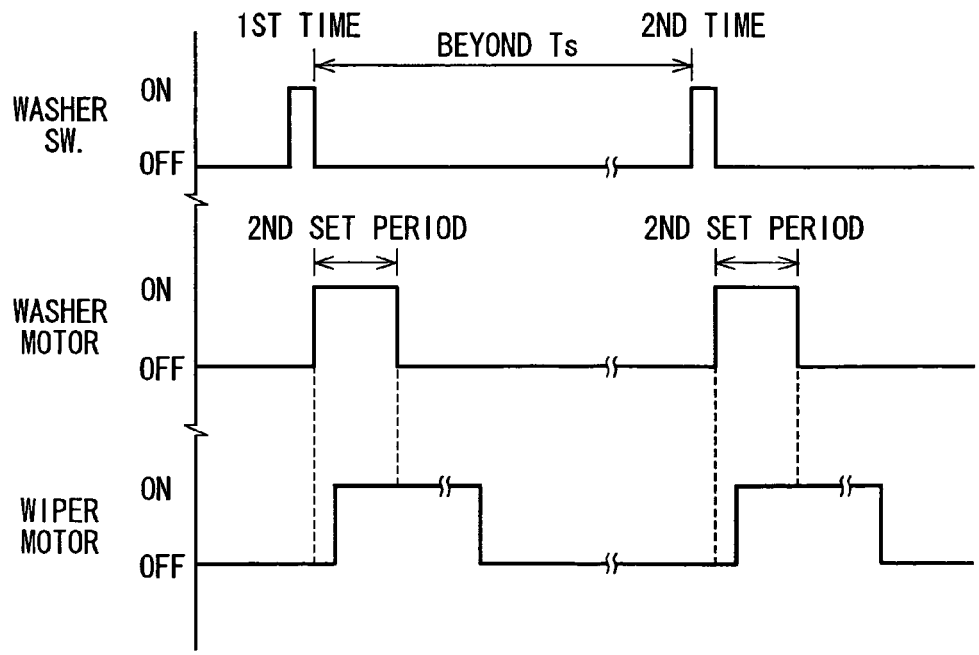
FIG. 3 is a timing chart showing an operation pattern of the windshield washer system according to the embodiment.
Figure 4:
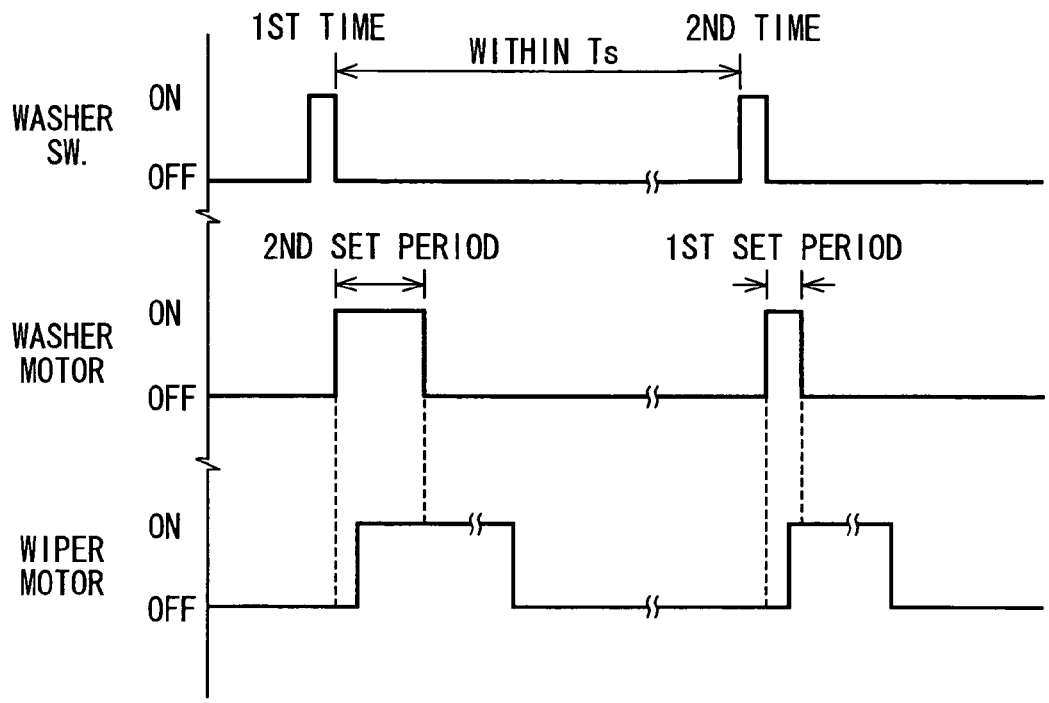
FIG. 4 is a timing chart showing another operation pattern of the windshield washer system according to the embodiment.
Figure 5:
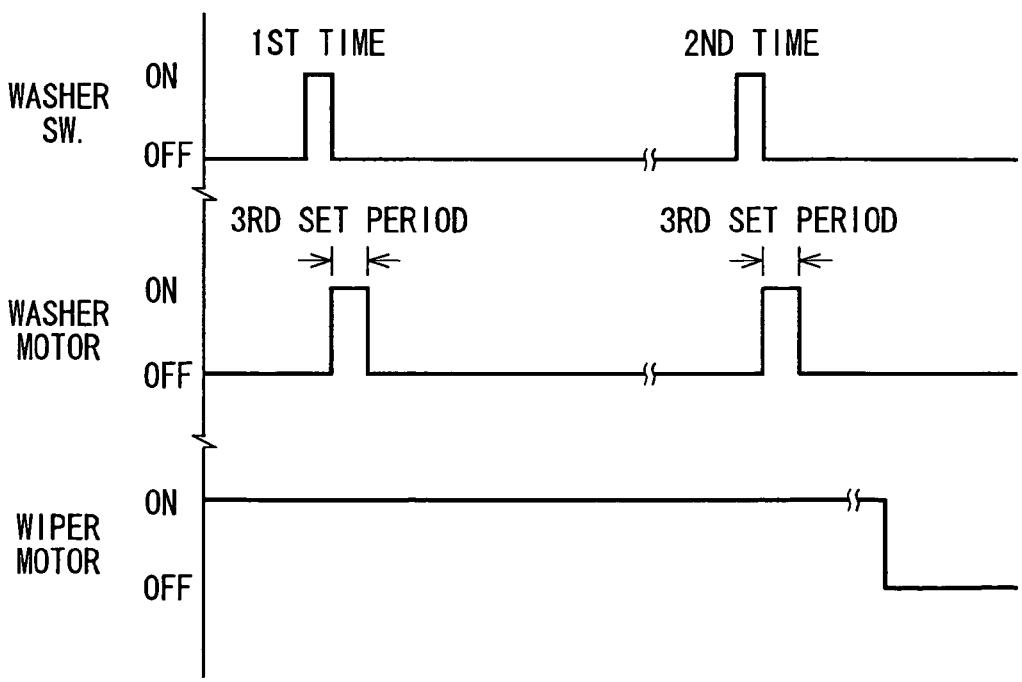
FIG. 5 is a timing chart showing still another operation pattern of the windshield washer system according to the embodiment.

FIGS. 3 to 5 are timing charts showing operation patterns of the washer motor 11 and the wiper motor 30 corresponding to the manipulations of the washer switch 21.

FIG. 3 depicts a case that a second manipulation of the washer switch 21 is performed when a period beyond the set interval time Ts (5 minutes) is elapsed since a first manipulation of the washer switch 21. In this case, the washer motor 11 operates for the second set time t2 (0.5 second) in accordance with the first manipulation of the washer switch 21, so as to spray the cleaning liquid for the second set time t2. Then, the wiper motor 30 starts operating slightly after the washer motor 11 starts operating, so as to be interlocked with the operation of washer motor 11, and stops operating after wiping the windshield glass 1 to-and-fro by a predetermined times after the washer motor 11 stops operating.

The second manipulation of the washer switch 21 is performed after the set time Ts is elapsed since the manipulation release of the first manipulation. That is, the washer controller 20 according to the present embodiment determines an interval time Tint, which is from a drop of the pulse-like shaped washer switch ON signal corresponding to the first manipulation of the washer switch 21 to a rise of the washer switch ON signal corresponding to the second manipulation of the washer switch 21, is greater than the set time Ts or not. FIG. 3 depicts the case in which the interval time Tint is greater than the set time Ts.

Accordingly, the washer motor 11 operates for the second set time t2 corresponding to the second manipulation of the washer switch 21 in the same manner as its operation corresponding to the first manipulation. The wiper motor 30 starts operating after the predetermined delay time so as to be interlocked with the operation of the washer motor 11, and stops after wiping the windshield glass 1 by the predetermined times.

FIG. 4 depicts a case that the second manipulation of the washer switch 21 is performed when a period within the set interval time Ts (5 minutes) is elapsed since a first manipulation of the washer switch 21. In this case, the washer motor 11 operates for the second set time t2 (0.5 second) in accordance with the first manipulation of the washer switch 21, so as to inject the cleaning liquid for the second set time t2. Then, the wiper motor 30 starts operating slightly after the washer motor 11 starts operating, so as to be interlocked with the operation of washer motor 11, and stops operating after wiping the windshield glass 1 to-and-fro by a predetermined times after the washer motor 11 stops operating.

The second manipulation of the washer switch 21 is performed before the set time Ts (5 minutes) is elapsed since the manipulation release of the first manipulation of the washer switch 21. Thus, the washer motor 11 operates for the first set time t1 corresponding to the second manipulation of the washer switch 21, in a different manner from its operation corresponding to the first manipulation. The wiper motor 30 starts operating after the predetermined delay time so as to be interlocked with the operation of the washer motor 11, and stops after wiping the windshield glass 1 by the predetermined times.

FIG. 5 depicts a case that two manipulations of the washer switch 21 are performed while the wiper switch 60 is in operational positions, that is, while the wiper 40 is in operation. In this case, the washer motor 11 operates for the third set time t3 (0.2 second) in accordance with each of the first and second manipulations of the washer switch 21, so as to spray the cleaning liquid for the second set period t3, regardless of whether the second manipulation of the washer switch 21 is performed after the set time Ts has elapsed or not. Then, the wiper motor 30 starts operating slightly after the washer motor 11 starts operating, so as to be interlocked with the operation of washer motor 11, and stops operating after wiping the windshield glass 1 to-and-fro by a predetermined times after the washer motor 11 stops operating.

In the present embodiment, both of the first set time t1 and the third set time t3 are equally set to 0.2 second that is smaller than 0.5-second of the third set time t3. However, it is possible to set the first set time t1 larger than the third set time t3. It is also possible to set the third set period t1 smaller than the third set time t3.

Figure 6:
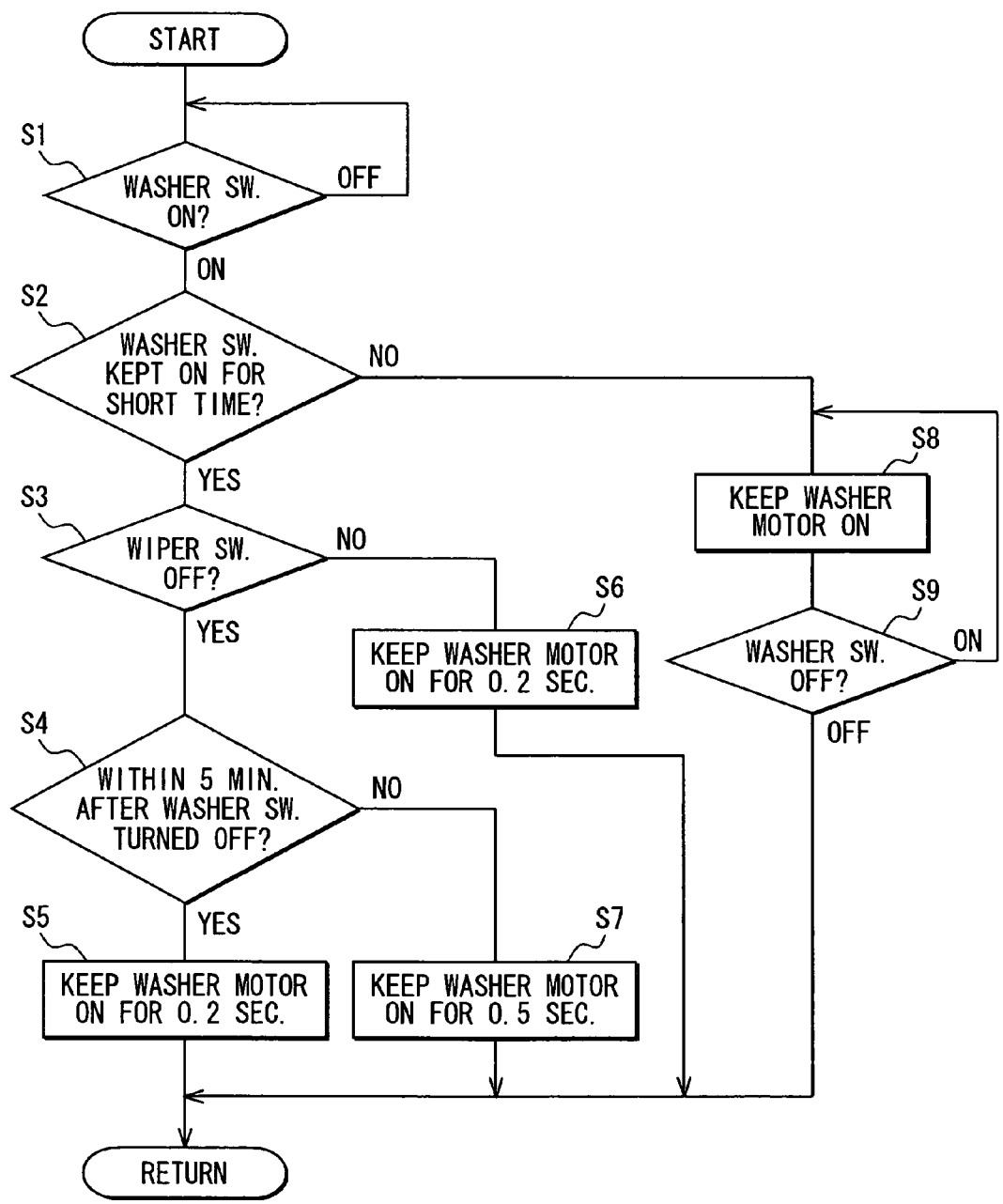
FIG. 6 is a flowchart showing a washer controlling process by the washer controller according to the embodiment.

In the following is described an control procedure of the washer controller 20 according to the present embodiment, and a control procedure of the wiper controller 50, which is interlocked with the washer controller 20, referring to FIGS. 6, 7.

Firstly, the control procedure of the washer controller 20 is described below, referring to FIG. 6. When the washer controller 20 starts its control operation, the washer switch detector 22 determines whether a manipulation of the washer switch 21 is performed or not in a step S1.

When the washer switch detector 22 determines that the manipulation of the washer switch 21 is performed, that is, if ON in the step S1, the washer switch detector 22 outputs the washer switch ON signal to the spray time controller 24. Further, the washer switch detector 22 calculates the interval time Tint. If the calculated interval time Tint is within the set period Ts, the washer switch detector 22 outputs the below-set time signal.

When the washer switch detector 22 determines that the manipulation of the washer switch 21 is not performed, that is, if OFF in the step S1, the washer switch repeats determining whether the manipulation of the washer switch 21 is performed or not.

When the washer switch detector 22 determines that the manipulation of the washer switch 21 is performed, that is, if ON in the step S1, the spray time controller 24 determines whether the manipulation duration of the washer switch 21 is within the set time T0 or not in a step S2.

When the spray time controller 24 determines that the manipulation duration of the washer switch ON signal is within the set time T0, that is, if YES in the step S2, the wiper switch detector 23 determines whether the wiper switch 60 is switched in OFF position or not, that is, whether the wiper switch 60 is not switched in the operational positions or in the operational positions in a step S3.

When the wiper switch detector 23 determines that the wiper switch 60 is switched in the OFF position, that is, if YES in the step S3, the spray time controller 24 determines whether it receives the below-set time signal or not in a step S4. When the spray time controller 24 determines that it receives the below-set time signal, that is, if YES in the step S4, the spray time controller 24 sets the spray time Tsp to the first set time t1 (0.2 second), and then outputs the washer operation signal to the washer motor controller 25 for a period corresponding to the spray time Tsp in a step S5. The washer motor controller 25, which receives the washer operation signal, keeps supplying the driving voltage to the washer motor 11 for throughout a period it receives the washer operation signal. Thus, the washer motor 11 operates for the first set time t1, so as to spray the cleaning liquid to the windshield glass 1. After completing the process of the step S5, the control procedure returns again to the step S1.

When the spray time controller 24 determines that it does not receive the below-set time signal, that is, if NO in the step S4, the spray time controller 24 sets the spray time Tsp to the second set time t2 (0.5 second), and outputs the washer operation signal to the washer motor controller 25 for a period corresponding to the spray time Tsp, in a step S7. The washer motor controller 25, which receives the washer operation signal, supplies the driving voltage to the washer motor 11 for throughout a period it receives the washer operation signal. Thus, the washer motor 11 operates for the second set time t2, so as to spray the cleaning liquid to the windshield glass 1. After completing the process of the step S7, the control procedure returns again to the step S1.

When the wiper switch detector 23 determines that the wiper switch 60 is switched in the operational positions, that is, if NO in the step S3, the spray time controller 24 sets the spray time Tsp to the third set time t3 (0.2 second), and then outputs the washer operation signal to the washer motor controller 25 for a period corresponding to the spray time Tsp in a step S6. The washer motor controller 25, which receives the washer operation signal, supplies the driving voltage to the washer motor 11 for throughout a period it receives the washer operation signal. Thus, the washer motor 11 operates for the third set time t3, so as to spray the cleaning liquid to the windshield glass 1. After completing the process of the step S6, the control procedure returns again to the step S1.

When the spray time controller 24 determines that the manipulation duration of the washer switch ON signal is greater than the set time T0, that is, if NO in the step S2, the wiper switch detector 23 outputs the washer operation signal in a step S8) for a throughout period it receives the washer switch ON signal (ON in a step in a step S9), regardless of whether it receives the wiper operation signal or not. Thus, the washer motor controller 25 supplies the driving voltage to the washer motor 11 so as to operate the washer motor 11 continuously.

When the spray time controller 24 stops receiving the washer switch ON signal during the above-mentioned continuous operation of the washer motor 11, that is, if OFF in the step S9, the spray time controller 24 stops outputting the washer operation signal to the washer motor controller 25 so as to complete the control procedure of the washer controller 20. Thus, the washer motor controller 25 stops supplying the driving voltage to the washer motor 11 so as to stop operating the washer motor 11, and then the control procedure returns again to the step S1.

Next, the control procedure of the wiper controller 50 is described below, referring to FIG. 7.

When the wiper controller 50 starts its control operation, the gang operation controller 53 determines whether the driving voltage is supplied from the washer controller 20 to the washer motor 11 in a step S21.

When the gang operation controller 53 determines that the driving voltage is not supplied to washer motor 11, that is, if NO in the step S21, the gang operation controller 53 repeats the process of the step S21. When the gang operation controller 53 determines that the driving voltage is supplied to the washer motor 11, that is, if YES in the step S21, the gang operation controller 53 outputs the wiper ON signal to the wiper motor controller 51 after a predetermined delay time so as to let the wiper motor controller 51 operate the wiper motor body 31 in a step S22.

During the operation of the wiper motor body 31, the gang operation controller 53 monitors whether the driving voltage is supplied to the washer motor 11 or not. When the gang operation controller 53 determines that the driving voltage is supplied to the washer motor 11, that is, if NO in the step S23, the gang operation controller 53 continues the operation of the wiper motor body 31.

When the gang operation controller 53 determines that the driving voltage is not supplied to the washer motor 11, that is, if YES in the step S23, the gang operation controller 53 keeps outputting the wiper ON signal to the washer motor 11 until a predetermined time period is elapsed since the driving voltage stops being supplied to the washer motor 11, and then completes the control procedure of the wiper controller 50 in a step S24. The wiper blade 42 performs further wiping operations to-and-fro by a predetermined times, by the wiper ON signal kept being outputted by the predetermined time period even after the driving voltage stops being supplied. After the process of the step S24, the control procedure of the wiper controller 50 returns again to the step S21.

Figure 7:
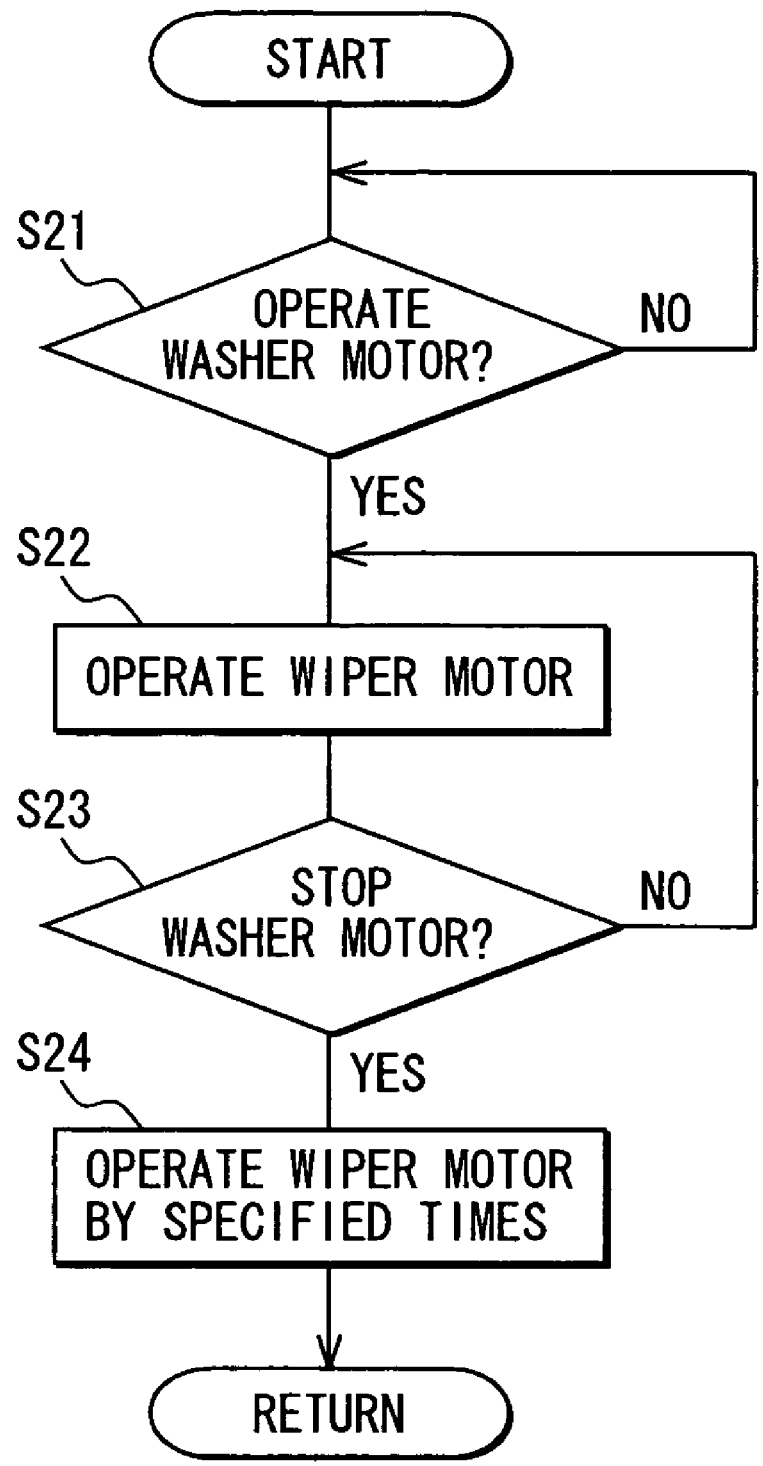
FIG. 7 is a flowchart showing a wiper controlling process by the washer controller according to the embodiment.

By the control procedure of the wiper controller 50 shown in FIG. 7, when the wiper switch 21 is manipulated, the wiper controller 50 can start operating the wiper motor body 31 after the predetermined delay time, and the wiper controller 50 can perform the wiping operation of the wiper blade 42 to-and-fro by the predetermined times even after the operation of the washer motor 11 stops. Accordingly, when the washer motor 11 operates, the wiper motor body 31 performs the predetermined operations to be interlocked with the operation of the washer motor 11, regardless of a manipulation interval of the washer switch 21, the manipulation duration, and the like.

In the above-described embodiment, the spray time Tsp is set in a two-step manner by determining whether the time interval Tint from the manipulation release of one manipulation of the washer switch 21 to the next manipulation of the washer switch 21 is within the set time T0 or greater than the set time T0. However, the present invention is not limited to this embodiment. For example, the washer controller and the washer system according to the present embodiment may be configured to set the spray time Tsp to be inversely proportional to a length of the interval time Tint.

In the above-described embodiment, the washer switch 21 has only a manipulation position and manipulation release position, so as to spray the cleaning liquid continuously to the windshield glass 1 when the washer switch 21 is held in the manipulated position continuously for more than a set time T0 manipulation. The construction of the washer switch 21 is not limited to this one.

For example, the washer switch 21 may have two manipulation positions including a short (normal) spray position and a continuous spray position. As a mechanism having the two manipulation positions, the washer switch 21 may be configured to be switched in the short (normal) spray position when the washer switch 21 is lightly operated (pushed, pulled, etc.), and in the continuous spray position when the washer switch 21 is strongly operated (pushed, pulled, etc.).

In this case, the washer controller 20 may be configured so as to control the spray time controller 24 to set the spray time Tsp to the first set time t1 or the second set time t2 in accordance with the elapsed time since the last manipulation release of the washer switch 21 (to the third set time t3 during the operation of the wiper motor 30) regardless of the manipulation duration of the washer switch 21 when the washer switch 21 is switched in the short spray position, and to set the spray time Tsp in accordance with the manipulation duration of the washer switch 21 when the washer switch 21 is switched in the continuous spray position.

In the above-described embodiment, the spray time controller 24 performs on a condition that the manipulation duration of the washer switch 21 is within a first predetermined time T01 (T0), and sets the spray time Tsp so as to let the washer motor 11 continuously spray the cleaning liquid for a duration time of the manipulation of the washer switch 21 provided the manipulation duration of the washer switch 21 is greater than a second predetermined time T02 (T0). That is, both of the first predetermined value T01 and the second predetermined value T02 are set to an identical value T0. The present invention is not limited to this configuration. It is possible to set the first predetermined time to a value different from the second predetermined time T02.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A washer controller for a vehicle for controlling a washer motor in accordance with first and second manipulations of a washer switch so as to spray a cleaning liquid onto a window glass of the vehicle, the washer controller comprising:

a washer switch detector that determines whether the second manipulation of the washer switch was performed within a predetermined time period after the first manipulation of the washer switch, wherein the predetermined time begins from the first manipulation of the washer switch;

a spray time controller that sets a spray time to spray the cleaning liquid to a first set time when the washer switch detector determines that the manipulation of the washer switch was performed within the predetermined time period, and to a second set time when the washer switch detector determines that the manipulation of the washer switch was not performed within the predetermined time period, the second set time being greater than the first set time; and a washer motor controller that operates the washer motor for a time period corresponding to the spray time set by the spray time controller.

2. The washer controller according to claim 1, wherein the spray time controller performs the spray time provided a duration time of the manipulation of the washer switch is within a first predetermined time or provided the washer switch is not manipulated in a switching position to let the washer motor continuously spray the cleaning liquid.

3. The washer controller according to claim 1, further comprising a wiper switch detector that determines whether the wiper motor is operating or not, wherein the spray time controller sets the spray time to third set time when the wiper switch detector determines that the wiper motor is operating, regardless of whether the washer switch detector determines that the manipulation of the washer switch is performed within the predetermined time period or after the predetermined time period.

4. The washer controller according to claim 3, wherein the third set time is smaller than the second set time.

5. The washer controller according to claim 1, wherein the spray time controller sets the spray time so as to let the washer motor continuously spray the cleaning liquid for a duration time of the manipulation of the washer switch provided the duration time of the manipulation of the washer switch is greater than a second predetermined time or provided the washer switch is manipulated in a switching position to let the washer motor continuously spray the cleaning liquid.

6. A washer system for a vehicle for controlling a washer motor in accordance with a manipulation of a washer switch so as to spray a cleaning liquid onto a window glass of the vehicle, the washer system comprising:

a washer controller according to claim 1; and a wiper controller that operates the wiper motor to let a wiper wipe the window glass of the vehicle, wherein the wiper controller operates the wiper motor to be interlocked with an operation of the washer motor controlled by the washer controller so that the wiper keeps wiping the window glass until the wiper performs at least one to-and-fro wipe operation of the window glass even after the washer motor stops.

7. A washer controller for a vehicle for controlling a washer motor in accordance with a time period between first and second manipulations of a washer switch to spray a cleaning liquid onto a window glass of the vehicle, the washer controller comprising:

a washer switch detector that determines whether a predetermined time period, which is measured from the first manipulation, elapsed prior to the second manipulation;

a spray time controller that sets a spray time to spray the cleaning liquid in response to the second manipulation of the washer switch to a first set time when the washer switch detector determines that the time interval did not elapse prior to the second manipulation and to a second set time when the washer switch detector determines that the predetermined time period elapsed prior to the second manipulation, wherein the second set time is greater than the first set time; and a washer motor controller that operates the washer motor for a time period corresponding to the spray time set by the spray time controller.

8. The washer controller according to claim 7, wherein the spray time controller performs the spray time provided a duration time of the manipulation of the washer switch is within a first predetermined time or provided the washer switch is not manipulated in a switching position to let the washer motor continuously spray the cleaning liquid.

9. The washer controller according to claim 7, further comprising a wiper switch detector that determines whether the wiper motor is operating or not, wherein the spray time controller sets the spray time to third set time when the wiper switch detector determines that the wiper motor is operating, regardless of whether the washer switch detector determines that the manipulation of the washer switch is performed within the predetermined time period or after the predetermined time period.

10. The washer controller according to claim 9, wherein the third set time is smaller than the second set time.

11. The washer controller according to claim 7, wherein the spray time controller sets the spray time so as to let the washer motor continuously spray the cleaning liquid for a duration time of the manipulation of the washer switch provided the duration time of the manipulation of the washer switch is greater than a second predetermined time or provided the washer switch is manipulated in a switching position to let the washer motor continuously spray the cleaning liquid.

12. A washer system for a vehicle for controlling a washer motor in accordance with a manipulation of a washer switch so as to spray a cleaning liquid onto a window glass of the vehicle, the washer system comprising:

a washer controller according to claim 7; and a wiper controller that operates the wiper motor to let a wiper wipe the window glass of the vehicle, wherein the wiper controller operates the wiper motor to be interlocked with an operation of the washer motor controlled by the washer controller so that the wiper keeps wiping the window glass until the wiper performs at least one to-and-fro wipe operation of the window glass even after the washer motor stops.

* * * * *